United States Patent

Willard et al.

[11] Patent Number: 5,230,799
[45] Date of Patent: Jul. 27, 1993

[54] FILTER FRAME

[75] Inventors: Gene S. Willard, Shawnee, Kans.; V. James Perlingiero, North Kansas City, Mo.

[73] Assignee: Electronic Realty Associates, L.P., Shawnee Mission, Kans.

[21] Appl. No.: 729,552

[22] Filed: Jul. 15, 1991

[51] Int. Cl.$^5$ ............................................. B01D 27/08
[52] U.S. Cl. .................................. 210/455; 210/483; 210/495; 55/495; 55/511; 55/DIG. 13
[58] Field of Search ......... 55/490, 495, 511, DIG. 31; 210/455, 483, 495, 498, 499, 542

[56] References Cited

U.S. PATENT DOCUMENTS

| | | |
|---|---|---|
| 2,160,003 | 5/1939 | Slayter et al. |
| 2,175,903 | 10/1939 | Lichtman |
| 2,677,436 | 5/1954 | Mazek |
| 2,723,731 | 11/1955 | Schaaf |
| 2,754,928 | 7/1956 | Hambrecht et al. |
| 2,869,694 | 1/1959 | Breckheimer |
| 2,973,831 | 3/1961 | Sprouse et al. |
| 2,981,367 | 4/1961 | Sprouse et al. |
| 3,031,047 | 4/1962 | Williams |
| 3,100,557 | 8/1963 | Getzin ................................ 55/490 |
| 3,107,990 | 10/1963 | Getzin |
| 3,150,945 | 9/1964 | Baggeson ...................... 55/DIG. 31 |
| 3,154,393 | 10/1964 | Klein et al. ................... 55/DIG. 31 |
| 3,237,387 | 3/1966 | Haugen et al. |
| 3,357,763 | 12/1967 | Toper ............................ 55/DIG. 31 |
| 3,388,536 | 6/1968 | Nash |
| 3,717,256 | 2/1973 | Parrott et al. ................. 55/DIG. 31 |
| 3,759,018 | 9/1973 | Scholl ............................... 55/511 |
| 3,774,377 | 11/1973 | Bishop ........................ 55/DIG. 31 |
| 3,905,787 | 9/1975 | Roth |
| 3,938,973 | 2/1976 | Kershaw |

Primary Examiner—Robert A. Dawson
Assistant Examiner—W. L. Millard
Attorney, Agent, or Firm—Kokjer, Kircher, Bowman & Johnson

[57] ABSTRACT

A filter frame formed from a stock channel member having a generally U-shaped cross-sectional configuration. The channel member may be provided in stock lengths which may be cut on-site to the desired size to form each side of a filter frame when assembled together. The cut lengths of the channel members may be assembled together in the appropriate configuration to match the filter being replaced, and a mass of filter medium cut to a corresponding configuration and placed within the cavity formed by the u-shaped cross-section of the channel members to form the air filter. The channel members are also provided with a plurality of U-shaped grooves in the upstanding legs of the channel members which form tabs. The tabs may be advantageously employed with a length of elongated material to form a protective screen. Specifically, a length of elongated material, such as string, may be wound about the tabs and across the length of the air filter to be wound through separate tabs. Repeating this process forms a substantially taught web of the elongated material which functions as a protective screen to maintain the filter medium in position.

16 Claims, 1 Drawing Sheet

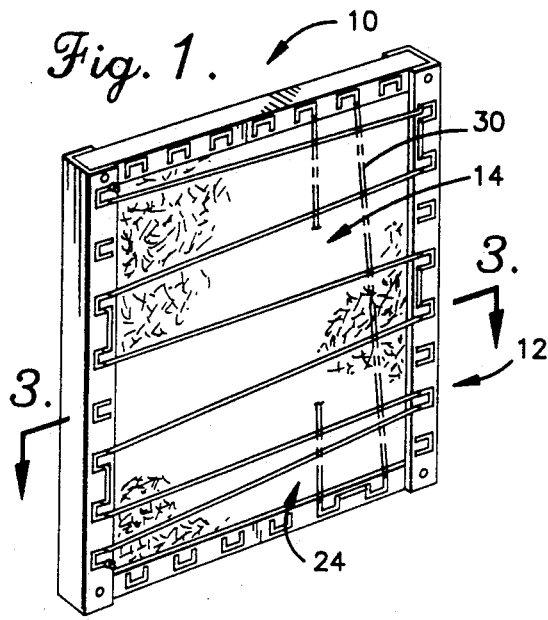
Fig. 1.
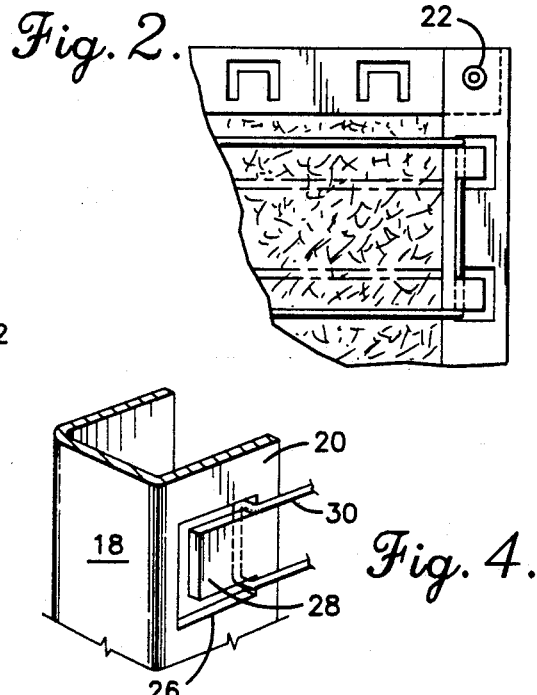
Fig. 2.
Fig. 4.
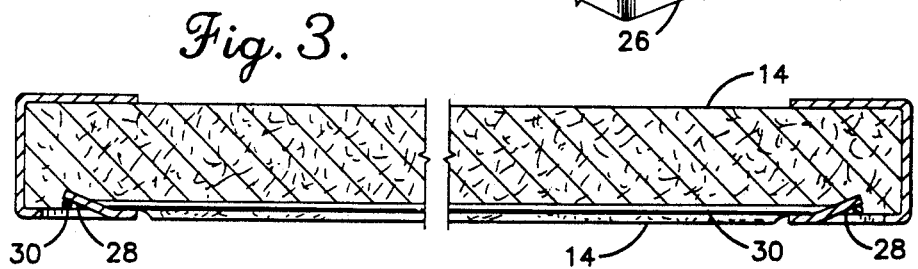
Fig. 3.
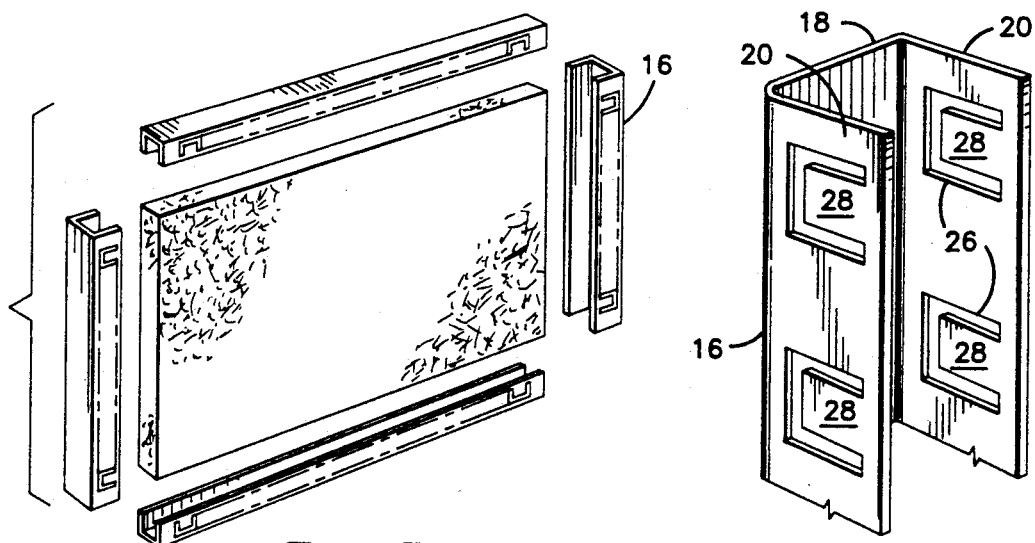
Fig. 5.
Fig. 6.

FILTER FRAME

BACKGROUND OF THE INVENTION

1. Field of the Invention

The present invention relates in general to filters for fluids. In particular, the present invention relates to an improved air filter for heating, cooling, ventilation and other equipment, which may be fabricated on site.

2. Description of the Related Art

It has been known for many years to employ air filters for a variety of equipment, most notably heating, cooling and ventilating equipment. Such filters typically take the form of a rectangular frame which serves to hold a filter medium therein. The filter medium may be any of a variety of substances including fiberglass, expanded paper or other materials which tend to trap particulates entrained in a gas stream which passes through the medium.

As the gas stream is directed to flow through the filter medium, pressures are exerted upon the medium due to this air flow. To ensure that the sometimes fragile medium is not removed from its peripheral frame due to this pressure, it has been known to provide a protective screen on one or both sides of the filter. This protective screen typically takes the form of a lattice having a large number of openings therein, which provide support to the filter medium while causing as little impediment to air flow as is possible.

During normal maintenance or during repair work upon the equipment containing such air filters, it is often necessary to replace the air filter. However, air filters are often designed to be unique to the particular piece of equipment, with little standardization of sizes. As such, it is often difficult to determine the particular size of air filter needed for a particular piece of equipment.

Since the vast majority of equipment containing such air filters is large and bulky, it must be serviced on site. This necessitates the worker carrying a large number of air filters of different sizes to the site, or determining the particular size of filter on site and then ordering that size air filter brought to the site. This arrangement is both inefficient and costly.

SUMMARY OF THE INVENTION

An object of the present invention is to provide an air filter which may be readily manufactured on site.

It is a further object of the present invention to provide a stock channel material which may be cut to length to form an appropriate sized filter on site.

A further object of the present invention is to provide a readily assembled filter frame having elements thereon which facilitate the formation of a reinforcing screen for the filter medium.

These and other objects are achieved by a stock channel member having a generally U-shaped cross-sectional configuration. The channel member may be provided in stock lengths which may be cut to the desired size to form each side of a filter frame when assembled together. This cutting may be performed on-site to replace any size filter, eliminating the need to carry a variety of preformed filter sizes or for ordering a particular size filter brought to the site. The cut lengths of the channel members may be assembled together in the appropriate configuration to match the filter being replaced, and a mass of filter medium may be cut to a corresponding configuration from a supply of stock filter medium. The filter medium will then be placed within the cavity formed by the U-shaped cross-section of the channel members to form the air filter. The channel members are also provided with a plurality of U-shaped grooves in the upstanding legs of the channel members which form tabs having free ends extending away from the opening of the channel member. While a separate protective screen may be cut to size and employed with the air filter, the tabs may be advantageously employed with a length of elongated material to form a protective screen. Specifically, a length of elongated material, such as string, may be wound about the tabs and across the length of the air filter to be wound through separate tabs. Repeating this process forms a substantially taught web of the elongated material across the face of the air filter. This web functions as a protective screen to maintain the filter medium in position.

BRIEF DESCRIPTION OF THE DRAWING

The objects and features of the invention noted above are explained in more detail with reference drawings in which like reference numerals denote like elements, and in which:

FIG. 1 is a perspective view of a filter formed according to the present invention;

FIG. 2 is a detail view of a corner of the filter of FIG. 1;

FIG. 3 is a cross-sectional view of an alternative embodiment of the present invention;

FIG. 4 is a detail view showing an alternative arrangement of the flaccid material;

FIG. 5 is an exploded view of the filter of FIG. 1; and

FIG. 6 is a detail perspective view of a channel member employed in the present invention.

DETAILED DESCRIPTION OF THE INVENTION

With reference to FIG. 1, reference numeral 10 generally designates a filter according to the present invention. The filter 10 generally includes a rigid peripheral frame 12 and a mass of filter medium 14 retained within the frame 12.

As is best shown in FIG. 5, the frame is formed of a plurality of segments or lengths of channel material 16. The channel material 16 has a generally U-shaped cross-sectional configuration including a cross member 18 having lateral edges and a pair of cantilevered legs 20, each of which extends outwardly from one of the lateral edges of the cross member 18.

The filter medium 14 includes an outer periphery which corresponds substantially in shape and size to the peripheral configuration of the frame 12, and in particular to the cross members 18 of the frame 12. As such, when the filter 10 is assembled, the filter medium 14 will be received between the legs 20 of each of the segments of channel material 16, as is best shown in FIG. 3.

To maintain the frame 12 in the proper configuration, the ends of adjacent segments of the channel material will overlap, as shown in FIGS. 1 and 2. To facilitate this overlap, the legs 20 of one adjacent segment may be bent inwardly, while the legs 20 of the other adjacent segment are bent outwardly, in the immediate area of the overlap. In this manner, one of the segments may be received within the legs 20 of the other segment. Alternatively, two different types of channel material may be supplied, with one type having a cross member 18 having a lesser lateral dimension such that this first type of channel material is readily received between the legs 20 of the other type of channel material.

In either event, the overlapping legs of the adjacent segments of channel material 16 are secured together. This may be affected by a variety of means, including adhesives or welding. However, drilling a hole through the overlapping legs 20 allows a pop rivet 22 to be introduced and secure each pair of overlapping legs. As such, two pop rivets 22 will be employed at each corner of the frame 12, although a single pop rivet may be acceptable for some applications.

The segments or lengths need not be actual discrete pieces, but may be formed by slitting the legs and forming a fold in the cross member at the desired location of a corner. As in the previous example, the legs must overlap, and a pop rivet or other means may secure the legs together. In this manner, the two or more sides of the peripheral frame may be formed from a single length of the channel material without requiring full cutting of the material.

An important feature of the present invention is a provision for the formation of a protective screen or lattice, generally identified by reference numeral 24. To provide for this lattice, one or both of the legs 20 of the channel material 16 include a longitudinally spaced series of cutouts 26 which define a tab 28 extending towards the cross member 18 of the channel material 16. As shown in the drawings, the cutouts 26 are U-shaped grooves extending through the legs 20. However, other configurations could of course be used. For example, the cutouts 26 may be v-shaped such that the tab 28 tapers inwardly towards a free apex in the direction of the cross member 18. Additionally, the cutouts 26 need not be in the form of grooves, but may merely be formed by cuts extending through the material forming the leg 20, with the tab 28 struck outwardly at a small angle from the plane of the associated leg 20 for a reason made clear below.

As is best shown in FIGS. 1-4, the tabs 28 may be employed to retain one or more elongated members 30 in a configuration which defines the lattice 24. Specifically, the elongated member 30 is a long length of material having a cross-sectional periphery such that it may fit within the cutouts 26 (or below the struck-out tab 28) to therefore extend around the tab 28 and be retained in position thereby. The elongated member 30 may advantageously take the form of a flaccid fibrous or polymer string or line, or may be formed of a small gauge metal wire.

As is best shown in FIG. 1, a first end of the elongated member 30 is fixed to one of the tabs 28 adjacent a corner of the frame 12 as by forming a knot in the end of the member which will not fit through the cutout 26 or by tying the elongated member to itself about the tab 28. Once the first end of the elongated member 30 has been retained to the tab adjacent the starting corner, the elongated member is extended across the width of the filter frame to thereby extend across the outer face of the filter medium 14. The elongated member 30 is pulled somewhat taut and then inserted below a tab 28 formed in the section of channel member opposed to the starting section.

As shown in FIG. 2, the elongated member 30 can extend below a first tab 28 to, and below, a second tab 28 within the same section of channel material 16 before the elongated member 30 is extended back across the filter medium 14. Alternatively, as shown in FIG. 4, the elongated member 30 may extend under a single tab 28 prior to extending back across the filter medium 14. As may be readily apparent from this description, the elongated member 30 could obviously extend for three or more tabs 28 prior to extending across the filter medium 14. The particular number of tabs engaged in each section of channel material prior to extending back across the filter medium depends upon the filter medium employed and its relative stiffness and structural integrity, and therefore its need for the structural support provided by the lattice 24.

As noted above, the elongated member 30 is extended back across the filter frame, and thus the filter medium, and is pulled taught prior to engagement with a further tab or tabs in the initial section of channel material. This process is repeated to form a series of lengths of elongated member 30 extending across the width of the filter frame and spaced along the height of the filter frame, as shown in FIG. 1. When substantially the entire face of the filter medium 14 has been covered by the spaced segments of elongated member 30, the elongated member is fixed to a last one of the tabs, in a manner similar to fixing the first free end of the elongated member. A shown in FIG. 1, the starting and ending ends of the elongated member 30 are both fixed the same section of channel material 16. However, as should be apparent, either end of the elongated member 30 could be fixed to either section of channel material 16.

Upon completion, the spaced lengths of elongated member 30 extending across the filter medium 14 will serve as a supporting lattice to maintain the filter medium 14 within the frame 12. Where the particular filter medium employed is particularly delicate, a second elongated member 30 may be applied to the filter frame across its height with the various lengths of elongated member 30 being spaced along the width of the filter frame, substantially perpendicular to the lengths of the elongated member 30 previously applied. Of course, it should be apparent that a single elongated member 30 of sufficient length could be employed for both directions. Additionally, where the filter medium is particularly delicate, one or more elongated members 30 may be fixed to the filter frame to extend across the opposite face of the filter medium 14, thus reinforcing the filter medium upon both sides.

With particular reference to FIG. 3, an alternative method of fixing the members 30 to the frame is shown. In particular, in this Fig. the member 30 is shown as being primarily within the channels of the frame, and extending over, rather than under, the tabs. This is particularly advantageous where the width of the frame is crucial, as where the filter frame is tightly held within a support cage of the equipment. The channel members may also be formed of a sufficiently light gauge material such that the tension placed upon the elongated member causes the tab to be bent inwardly, placing the overlapping portion of the elongated member below the outer extent of the frame. The frame may thus be held tightly within the support cage of the equipment without contact between the elongated member and the support cage, which could cause the elongated member to be frayed of broken. It should also be noted that the elongated member may extend over multiple tabs 28, in a manner analogous to that shown in FIG. 2.

As an alternative when the width dimension of the filter is critical, the elongated member may be engaged over the frame (and thus under the tabs), but the width of the stock channel members provided may be smaller by the anticipated diameter of the elongated member.

This will result in the combined width of the frame and elongated member being within the desired limits.

It should be apparent that the engagement of the elongated member under the tabs would be more difficult with the filter medium in place. For this reason it is preferred that the elongated member be engaged without the filter medium present, and then the filter medium be compressed to fit within the assembled filter frame from the side opposite that having the elongated member. Once the filter medium is within the cavity of the frame it may be allowed to expand to be normally retained within the frame.

The present invention has particular use in forming air filters on the job site. In particular, the channel material 16 may be supplied to the worker in stock lengths (with a second set of stock lengths being provided where channel material having different widths of cross member 18 are employed). Upon determining the particular size of filter to be replaced, the worker will cut the stock lengths of channel material 16 to provide the appropriate segments necessary to form the filter frame 12. The worker will then provide a suitably sized and shaped piece of filter medium 14 for inclusion within the frame 12. This is advantageously effected by supplying slabs or rolls of filter medium which may be cut to the proper size. This filter medium may be reinforced as supplied, or may be unreinforced.

The worker would then assemble the segments of channel material 16 into their proper final configuration, with the filter medium 12 received between the legs 20 of each segment of channel material 16. The segments of channel material would then be fixed together at each of the corners of the frame, as by riveting, gluing, or other means as discussed above.

Where the filter medium requires reinforcement, the worker will then engage the elongated member or members 30 with the tabs 28 in the frame to form the reinforcing lattice 24. In this manner, an appropriately sized filter may be formed on-site to meet the particular dimensional needs of the equipment being repaired or maintained, without the need for stocking a variety of air filter sizes.

While the invention has been described above with regard to a specific embodiment, it should be apparent that various modifications may be made. For example, the channel material 16 may be formed of a light gauge metal to allow cutting with tin snips, or may be formed of an appropriately rigid plastic or other material. Additionally, the lattice need not be substantially parallel to the edges of the frames, but may extend in any direction across the filter medium, so long as it provides the appropriate support. Furthermore, one or more elongated members may be used on each face, with one or more elongated members being employed for any one direction, even to the point of each elongated member extending only between two tabs.

From the foregoing it will be seen that this invention is one well adapted to attain all ends and objects hereinabove set forth together with the other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A filter for fluids, comprising:
    a plurality of segments of channel material having a substantially U-shaped cross section including a cross member having lateral edges and a leg connected to each of said edges and extending outwardly therefrom in a direction, at least one of said legs including a series of longitudinally spaced tabs formed therein and having a free end projecting substantially towards said cross member, said segments being connected end-to-end to form a closed perimeter filter frame with said legs of said segments projecting towards the interior of said frame;
    a filter medium having an outer peripheral configuration substantially corresponding to that of said frame and having an outer peripheral edge portion received between said legs of said segments, whereby said filter medium is received in said frame and presents first and second faces surrounded by said frame; and
    an elongated member fixed to at least two of said segments by engagement with at least one of said tabs of each of said segments and extending across one of said faces of said filter medium to thereby support said filter medium against dislocation from said frame.

2. A filter frame as in claim 1, further comprising a second elongated member fixed to at least two other of said segments by engagement with at least one of said tabs of each of said associated segments and extending across said one of said faces of said filter medium to thereby support said filter medium against dislocation from said frame.

3. A filter frame as in claim 2, wherein both of said legs include said series of tabs.

4. A filter frame as in claim 1, further comprising a second elongated member fixed to at least two of said segments by engagement with at least one of said tabs of each of said associated segments and extending across the other of said faces of said filter medium to thereby support said filter medium against dislocation from said frame.

5. A filter frame as in claim 4, wherein both of said legs include said series of tabs.

6. A method of forming a filter for fluids, comprising the steps of:
    providing at least one length of channel material each having a substantially U-shaped cross section including a cross member having lateral edges and a leg connected to each of said edges and extending outwardly therefrom in a direction, at least one of said legs including a series of longitudinally spaced tabs formed therein and having a free end projecting substantially towards said cross member;
    providing a portion of filter material;
    cutting at least one of said lengths of channel material into segments each corresponding to a dimension of a filter assembly to be replaced;
    cutting said portion of filter material into a filter medium having a peripheral size and configuration substantially equal to that of the filter assembly to be replaced;
    assembling said segments of channel material together with said segments connected end-to-end to form a closed perimeter filter frame with said legs of said segments projecting towards the interior of said frame;

assembling said filter medium and said filter frame together with an outer peripheral edge portion of said filter medium received between said legs of said segments, whereby said filter medium is received in said frame and presents first and second faces surrounded by said frame; and fixing an elongated member to at least two of said segments by engagement with at least one of said tabs of each of said segments whereby said elongated member extends across one of said faces of said filter medium to thereby support said filter medium against dislocation from said frame.

7. A method as in claim 6, wherein said step of assembling said segments together and said step of assembling said filter medium and filter frame are performed simultaneously.

8. A method as in claim 7, further comprising the step of fixing a second elongated member to at least two other of said segments by engagement with at least one of said tabs of each of said associated segments whereby said elongated member extends across said one of said faces of said filter medium to thereby support said filter medium against dislocation from said frame.

9. A method as in claim 8, wherein said step of providing channel material comprises both of said legs including said series of tabs.

10. A method as in claim 7, further comprising the step of fixing a second elongated member to at least two of said segments by engagement with at least one of said tabs of each of said associated segments whereby said elongated member extends across the other of said faces of said filter medium to thereby support said filter medium against dislocation from said frame.

11. A method as in claim 10, wherein said step of providing channel material comprises both of said legs including said series of tabs.

12. A method as in claim 6, wherein said step of assembling said filter medium and filter frame is performed subsequent to said step of fixing said elongated member.

13. A method as in claim 12, further comprising the step of fixing a second elongated member to at least two other of said segments by engagement with at least one of said tabs of each of said associated segments whereby said elongated member extends across said one of said faces of said filter medium to thereby support said filter medium against dislocation from said frame.

14. A method as in claim 13, wherein said step of providing channel material comprises both of said legs including said series of tabs.

15. A method as in claim 12, further comprising the step of fixing a second elongated member to at least two of said segments by engagement with at least one of said tabs of each of said associated segments whereby said elongated member extends across the other of said faces of said filter medium to thereby support said filter medium against dislocation from said frame.

16. A method as in claim 15, where said step of providing channel material comprises both of said legs including said series of tabs.

* * * * *